US009157327B2

(12) United States Patent
Deal et al.

(10) Patent No.: US 9,157,327 B2
(45) Date of Patent: Oct. 13, 2015

(54) HYBRID METAL FAN BLADE (75) Inventors: James L. Deal, Amston, CT (US); John J. Schirra, Ellington, CT (US); Lee Drozdenko, Bristol, CT (US); William R. Graves, Manchester, CT (US); James O. Hansen, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 680 days.

(21) Appl. No.: 12/713,867

(22) Filed: Feb. 26, 2010

(65) Prior Publication Data

US 2011/0211967 A1 Sep. 1, 2011

(51) Int. Cl.
*F01D 5/14* (2006.01)
*F04D 29/02* (2006.01)
*F04D 29/32* (2006.01)

(52) U.S. Cl.
CPC .............. *F01D 5/147* (2013.01); *F04D 29/023* (2013.01); *F04D 29/324* (2013.01); *F05D 2240/303* (2013.01); *F05D 2300/173* (2013.01); *F05D 2300/174* (2013.01); *Y02T 50/672* (2013.01); *Y02T 50/673* (2013.01); *Y10T 29/49337* (2015.01)

(58) Field of Classification Search
CPC ............. F01D 5/14; F01D 5/28; F01D 5/286; F01D 5/288; F05D 2240/303
USPC .... 416/224, 62, 229 R, 223 R, 229 A, 223 A, 416/247 R
See application file for complete search history.

(56) References Cited

U.S. PATENT DOCUMENTS

| 2,431,184 | A | * | 11/1947 | Martin | 416/224 |
| 3,762,835 | A | * | 10/1973 | Carlson et al. | 416/224 |
| 4,006,999 | A | * | 2/1977 | Brantley et al. | 416/224 |
| 4,738,594 | A | | 4/1988 | Sato et al. | |
| 4,842,663 | A | * | 6/1989 | Kramer | 156/98 |
| 5,141,400 | A | * | 8/1992 | Murphy et al. | 416/204 A |
| 5,486,096 | A | * | 1/1996 | Hertel et al. | 416/224 |
| 5,490,764 | A | | 2/1996 | Schilling | |
| 5,520,516 | A | | 5/1996 | Taylor et al. | |
| 5,674,370 | A | | 10/1997 | DuPree | |
| 5,725,354 | A | | 3/1998 | Wadia et al. | |

(Continued)

FOREIGN PATENT DOCUMENTS

DE 10110102 A1 8/2002

OTHER PUBLICATIONS

European Search Report, dated Aug. 14, 2014, for European application No. 11250226.5, 7 pages.

*Primary Examiner* — Dwayne J White
*Assistant Examiner* — Adam W Brown
(74) *Attorney, Agent, or Firm* — Kinney & Lange, P.A.

(57) ABSTRACT

A fan blade is disclosed comprising a lightweight metallic airfoil portion and a high-strength sheath portion. The airfoil portion has a forward airfoil edge, a first airfoil surface, and a second airfoil surface. The sheath portion has a sheath head section, a first sheath flank, and a second sheath flank, both flanks extending chordwise from the forward sheath section. The sheath portion is bonded to the airfoil portion such that the sheath head section covers the forward airfoil edge, defining a blade leading edge. The first sheath flank covers a portion of the first airfoil surface proximate the airfoil forward edge, jointly defining a blade suction surface. The second sheath flank covers a portion of the second airfoil surface proximate the airfoil forward edge, jointly defining a blade pressure surface.

28 Claims, 3 Drawing Sheets

(56) References Cited

U.S. PATENT DOCUMENTS

| | | |
|---|---|---|
| 5,881,972 A | 3/1999 | Smith et al. |
| 5,908,285 A | 6/1999 | Graff |
| 6,004,101 A | 12/1999 | Schilling et al. |
| 6,037,004 A | 3/2000 | Zajchowski et al. |
| 6,114,050 A | 9/2000 | Westre et al. |
| 6,341,747 B1 * | 1/2002 | Schmidt et al. ............ 244/123.1 |
| 6,607,358 B2 * | 8/2003 | Finn et al. .................... 416/224 |
| 7,637,721 B2 | 12/2009 | Driver et al. |
| 2007/0084527 A1 * | 4/2007 | Ferrasse et al. ............... 148/550 |
| 2009/0025365 A1 * | 1/2009 | Schilling et al. ............. 60/39.34 |

\* cited by examiner

HYBRID METAL FAN BLADE

BACKGROUND

Titanium alloys and fiber composites are the benchmark classes of materials for fan and compressor blades in commercial airline engines. One reason for the materials being so broadly adopted is that regulations require an engine in commercial service to be capable of ingesting a medium-sized bird while allowing for continued operation or safe and orderly shutdown of that engine. Another reason is that the blades must resist cracking from nicks and dents caused by small debris such as sand and rain. Engines with titanium fan blades as well as certain reinforced fiber composite fan blades are the only ones that currently meet these criteria.

While titanium blades are relatively strong and light in weight, composite blades offer sufficient strength and a significant weight savings over titanium. However, composite blades do not scale well to smaller engine applications and the costs are several times those of already expensive titanium blades. Both titanium and fiber composite raw materials are also expensive to process. These blades often require expensive specialized equipment to process the material into an aerodynamic shape that maintains strength while keeping weight to a minimum. Further, due to their relatively low strain tolerance, composite blades require a greater thickness than otherwise equivalent metal blades to meet bird strike requirements. Greater blade thickness reduces fan efficiency and offsets a significant portion of weight savings from using composite materials.

SUMMARY

A fan blade is disclosed comprising an airfoil portion and a sheath portion. The airfoil portion is formed from a lightweight metallic material having a forward airfoil edge, a first airfoil surface, and a second airfoil surface. The sheath portion is formed from a high-strength metallic material having a sheath head section, a first sheath flank, and a second sheath flank, each extending rearwardly chordwise from the forward sheath section. The sheath portion is bonded to the airfoil portion such that the forward sheath section covers the forward airfoil edge, defining a blade leading edge. The first sheath flank covers a portion of the first airfoil surface proximate the airfoil forward edge, jointly defining a blade suction surface. The second sheath flank covers a portion of the second airfoil surface proximate the airfoil forward edge, jointly defining a blade pressure surface.

A method for making a fan blade is disclosed. An airfoil portion is formed from a lightweight metallic material, the airfoil portion having a first airfoil surface and a second airfoil surface, and a forward airfoil edge. A sheath portion is formed from a high strength metallic material, the sheath portion having a sheath head section, a first sheath flank, and a second sheath flank, the flanks extending rearwardly chordwise from the forward sheath section. The first and second airfoil surfaces include sheath receiving surfaces proximate the forward airfoil edge to accommodate the sheath portion. The receiving surfaces of the airfoil portion are covered with the sheath portion and bonded together.

DETAILED DESCRIPTION

Figure 1:
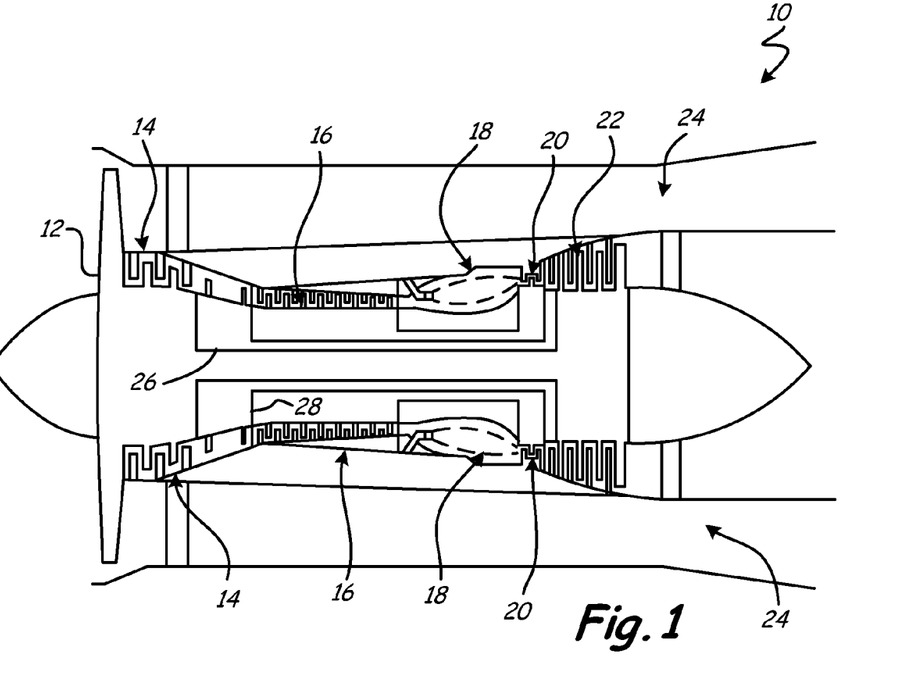
FIG. 1 schematically depicts a cross-section of a turbofan engine.

An example dual-spool turbofan engine is depicted in FIG. 1. Turbofan engine 10 comprises several sections: fan section 12, first low-pressure compressor section 14, second high-pressure compressor section 16, combustor section 18, first high-pressure turbine section 20, second low-pressure turbine section 22, bypass section 24, low-pressure shaft 26, and high-pressure shaft 28. A portion of the atmospheric air pulled in by rotation of fan section 12 is directed toward first compressor section 14, while the remainder is directed toward bypass section 24.

Air directed through first compressor section 14 is further compressed by second compressor section 16. Fuel is added and ignited in combustor section 18. Blades in turbine sections 20 and 22 capture a portion of the energy from passing combustion products by turning turbine rotors. Both fan section 12 and first compressor section 14 are rotatably linked via low-pressure shaft 26 to first low-pressure power turbine section 22. Second high-pressure compressor section 16 is rotatably connected to first high-pressure turbine section 22 via high-pressure shaft 28. Thrust is generated in engine 10 by the force of the air drawn in by fan section 12 and pushed through bypass section 24 (less any bleed air used for other aircraft functions), and by the force of exhaust gases exiting from second low-pressure turbine section 22.

In a turbofan engine, lighter components generally lead to more efficient performance. If less energy is expended to move internal engine parts, more energy is available for useful work. At the same time, the components themselves must be strong enough to withstand operational forces, and types of failure typical for the operating environment of the engine. Safety considerations and regulations based on the frequency and/or severity of possible failure will often dictate that the engine components also be able to withstand other atypical, yet foreseeable events. Because stronger and lighter components are often more expensive, a balance must be struck between efficiency, safety, and cost.

Few locations in an aircraft are more representative of efforts to optimize the balance between efficiency, safety, and cost than engine 10. While lighter materials are preferable to improve efficiency, the high risk of severe consequences from engine damage will require that engine 10 be made of components having additional margins of safety. Combining parts having both high strength and low density greatly restricts material choices and increases costs. Not infrequently, processing these strong and light materials such as titanium or composites is also complex and expensive.

Being designed to pull vast quantities of air through bypass section 24 to generate thrust, blades in fan section 12 are the first line of defense for engine 10 and are highly susceptible to both small and large scale damage from objects pulled in with the surrounding air, including bird impact damage.

Small scale blade damage causes performance deterioration and increases the number of potential crack initiation sites, while large scale damage includes blade deformation and failure. Small impacts can also lead to large scale damage by serving as crack initiation sites. Larger impacts, such as ingestion of birds can cause one or more blades to deform or break in a single event. Regulations are in place to limit the frequency and severity of single event failures because of the increased risk of emergency landings and catastrophic failure.

Blades made entirely from high-strength materials, such as titanium or titanium alloys like Ti-6Al-4V, have been proven to offer sufficient hardness to resist erosion and foreign object damage. But titanium alloys are often expensive to purchase and manipulate into a finished blade. And while titanium has a relatively low density compared to a number of metals, the weight of titanium fan blades are significant contributors to overall engine weight. Fiber composites offer significant weight savings relative to titanium and its alloys, but are far more expensive and do not offer the same resiliency.

Techniques have been developed to reduce costs and decrease weight by limiting the amount of material needed to form blades. For example, hollow blades are common in higher output engines, minimizing the amount of titanium or strands of composite needed. In addition, design approaches have been developed to minimize the weight impact of titanium blades. Complex computer-aided modeling further provides efficient blade shapes for a given application.

However, diminishing returns are seen with hollow blades in smaller engines. As the blades become smaller, the cavities also become smaller because the surfaces must have a certain thickness to maintain adequate structural support. Hollow blades are not usually cost-effective in smaller engines with smaller components and less thrust because the smaller cavity offers comparatively little weight savings. In small engines, the costs saved by reducing weight are frequently offset by added processing costs to form the smaller cavity.

Further, even in larger blades, current hollow metal blades are relatively expensive to manufacture. Expensive and complex processes such as diffusion bonding are often used to join two machined plates or two forged halves together into a large hollow blade. An expensive process like diffusion bonding can partially or completely offset the desired weight savings in some blades. Less expensive conventional processing, such as welding, is not particularly useful for hollow titanium blades because of the risk of stresses or brittleness caused by excess heat around the joined areas or by the geometry of the weld joint. Specialized and complex welding processes like laser or linear friction welding are available to reduce these risks, but do not reliably provide sufficient bonding area or structural capability to withstand various impacts and vibratory stresses on the blade.

Another technique of reducing weight of a blade is to use a lower-density metallic material for the airfoil body. As described earlier, composite blades are extremely light, but are far more complex and expensive to produce relative to titanium blades. Like hollow metal blades, small composite blades do not generally achieve sufficient weight savings to merit the additional complexity and cost.

Forming the blade from a lightweight metallic material can reduce cost and weight over a titanium blade. But without additional support or reinforcement, airfoils made solely from most lightweight metals or alloys do not offer sufficient strength and longevity for long-term use.

For example, even the strongest commercially available bulk aluminum alloys do not alone possess the ductility and resiliency necessary to meet current regulatory and design standards or acceptable maintenance intervals. Blades made solely of 6XXX- or 7XXX-series aluminum alloys are lighter in weight and less costly to produce than titanium blades. However, without additional fortification against foreign objects, such unprotected aluminum blades are susceptible to rapid deterioration and shorter lifecycles under normal operating conditions from damage caused by small and large scale impacts as described above.

Small-scale deterioration typically consists of pitting, nicks, dings, and erosion from sand, rain, and small runway debris. As atmospheric air is drawn into engine 10 by fan section 12, air is forced chordwise over a leading edge of the blades. The air frequently brings debris in that bombard the blades and compromise their aerodynamic shape, causing blades to depart significantly from their design. When blades lose their shape, efficiency decreases and fuel consumption increases.

This deterioration occurs relatively quickly in unprotected aluminum blades regardless of their overall strength. Though it would be expected that high-strength aluminum alloys, such as those produced via powder metallurgy and containing scandium, nickel, or certain rare earth metals could withstand this bombardment, they are still subject to rapid deterioration and erosion. Additionally, unprotected aluminum blades also experience more frequent unplanned failures from larger foreign object strikes, requiring immediate expensive repairs, downtime for the engine, and potentially catastrophic failure. In an example case of aluminum alloy fan blades having no additional protection, pitting and erosion can occur quickly. This can be on the order of weeks or days, or even over a single flight depending on the severity of flight conditions, thus necessitating shorter maintenance and replacement time horizons for unprotected lightweight blades.

Reinforcing and protecting leading portions of a lightweight blade, such as a blade made from an aluminum alloy, can reduce the weight of the blade while meeting or exceeding current design and safety requirements. The following figures describe blades that can be adapted for use in example dual-spool engine 10 shown in FIG. 1. In addition, the example blades described below can also be readily adapted for engines having any number of spools, such as engines with single spool or three-spool construction.

Figure 2:
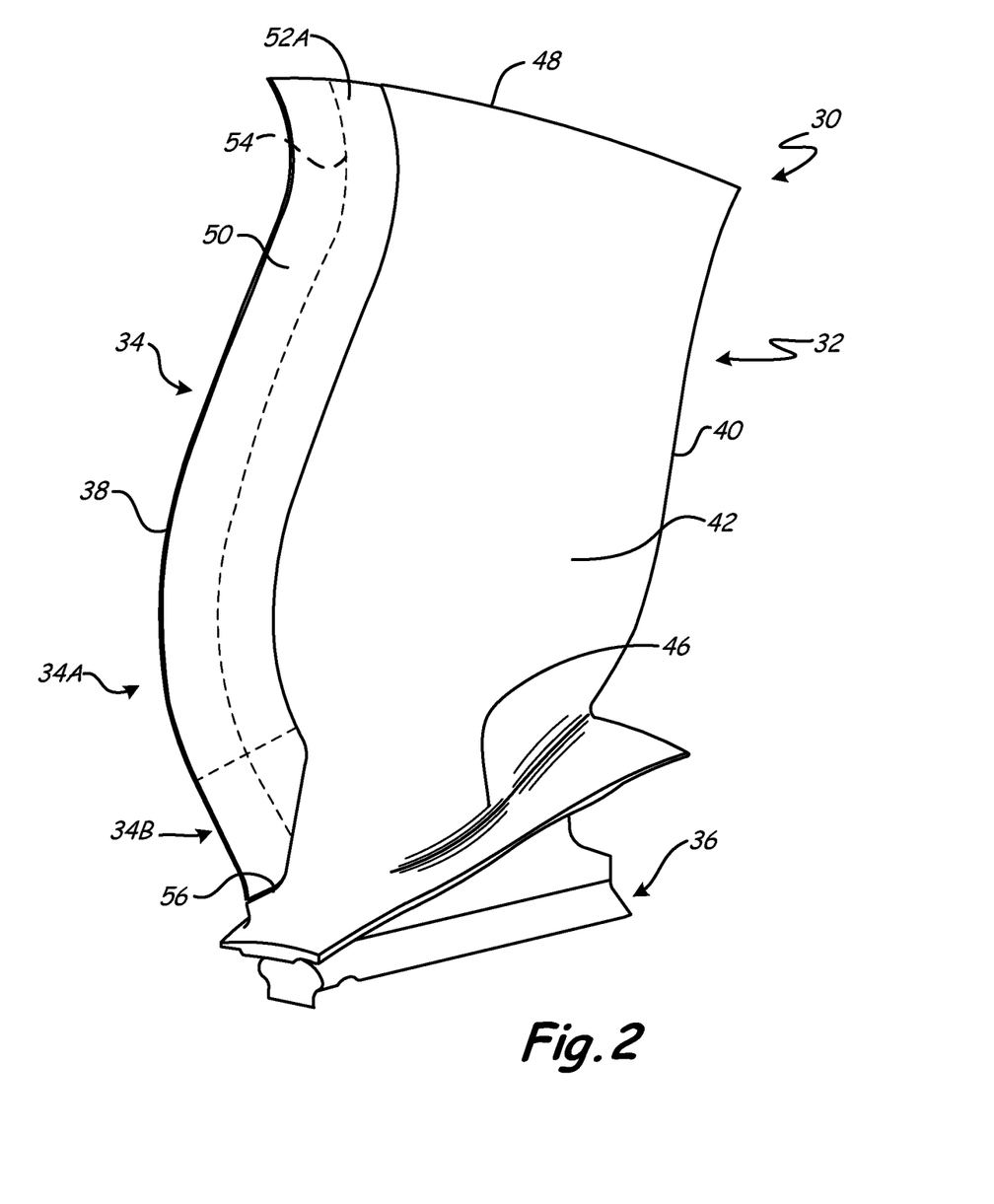
FIG. 2 is a side view of a hybrid metal fan blade having a dovetail root and a sheath disposed over the leading edge of the metal airfoil body.

A side view of exemplary blade 30 is shown in FIG. 2, which includes cross section 3-3. As seen in FIG. 2, three parts are joined to form blade 30: airfoil 32, sheath 34, and root 36. Blade 30 has inner and distal spanwise sheath sections 34A and 34B, respectively, leading edge 38, trailing edge 40, and suction surface 42. Blade 30 also includes platform 46, tip edge 48, sheath head section 50, sheath flank 52A, along with forward airfoil edge 54 and sheath inner end 56. Pressure surface 44 and sheath flank 52B are at the rear of blade 30 (not visible; shown in FIGS. 3A-3B).

Leading edge 38 and trailing edge 40 extend generally spanwise in a curved manner from platform 46 to tip edge 48. Air flows chordwise from leading edge 38 over suction surface 42 and pressure surface 44, meeting at trailing edge 40. Root 36 links blade 30 at platform 46 to a disk or rotor (not shown) in fan section 12. The disk is connected, either directly or through a gear train, to a power shaft, such as low-pressure shaft 26 powered by low-pressure turbine section 22 as shown in FIG. 1. Here root 36 is shown as a "dovetail" root; however such an arrangement is not required for the present invention. Alternatively, blade 30 can have a different configuration of root 36, or root 36 can be incorporated with the disk in what is known in the art as an integral rotor blade configuration.

Sheath 34 covers a portion of airfoil 32 proximal forward airfoil edge 54, extending spanwise over at least a part of the length of leading edge 38 between platform 46 and tip edge 48. Forward airfoil edge 54 is represented by a broken line extending spanwise along sheath 34. Sheath 34 is divided into two spanwise regions by a chordwise broken line proximal platform 46. Sheath 34 includes outer sheath region 34A, located distal from platform 46, and inner sheath region 34B, located proximal platform 46.

Airfoil 32 is formed of a lightweight metallic material such as one described below. To achieve the desired weight savings, airfoil 32 has a lower density than current titanium and titanium alloy blades. For example, titanium alloy Ti-6Al-4V, frequently used in aircraft blades, has a density of about 0.16 lb/in$^3$ (4.4 g/cm$^3$). In some embodiments, the lightweight material forming airfoil 32 has a density of about 0.07-0.14 lb/in$^3$ (1.9-3.9 g/cm$^3$), or about 10%-60% less than example Ti-6Al-4V. In other embodiments, the lightweight material has a density of about 0.08-0.12 lb/in$^3$ (2.2-3.3 g/cm$^3$), or about 25-50% less than Ti-6Al-4V. In yet other embodiments, wrought aluminum alloys, including 6XXX- and 7XXX-series alloys, range in density from about 0.09-0.11 lb/in$^3$ (2.5-3.0 g/cm$^3$). In this example, therefore, wrought aluminum alloys result in a weight savings of about 30-45% over Ti-6Al-4V for the airfoil 32 portion of blade 30 for an equivalent volume of material.

It has been found that adding protective sheath 34 over forward airfoil edge 54 of lightweight airfoil 32 can prevent a significant amount of such damage and slow degradation of blade 30. Combining lightweight airfoil 32, such as one formed from an aluminum alloy, with a high-strength metal sheath 34, like one formed from a titanium or nickel alloy, gives blade 30 substantially all of the strength and protection of a blade made solely from a titanium alloy. A lightweight low-cost metallic material in airfoil 32 offers significant cost and weight savings by restricting the use of the more expensive and higher-strength material to sheath 34. Sheath 34 directs the strength and resiliency of the stronger material to the most vulnerable locations of blade 30, including leading edge 38 and those portions of surfaces 42 and 44 proximate leading edge 38.

With the reduced density of the airfoil 32 material, such as an aluminum alloy, a corresponding loss in strength in airfoil 32 is also likely due to the use of a lower strength material. However, with the addition of sheath 34, some loss of strength is acceptable in airfoil portion 32. While airfoil 32 must have a significant amount of structural integrity to support sheath 34 and be stiff enough to withstand the various forces in engine 10, sheath 34 provides reinforcement of airfoil 32, giving blade 30 sufficient strength to meet applicable design and regulatory standards.

For comparison and as an example, Ti-6Al-4V alloys have yield strengths of about 120 ksi (830 MPa), though this value depends in part on the time and temperature of heat treatment. In some embodiments of the invention, the lightweight metallic material forming airfoil 32 has a yield strength between about 45-110 ksi (310-760 MPa), or about 10-60% less than example Ti-6Al-4V. In other embodiments, the lightweight metallic material has a yield strength between about 55-95 ksi (380-650 MPa), or about 20-50% less than example Ti-6Al-4V. In one example, airfoil 32 is formed from a 7XXX-series aluminum alloy having a yield strength between about 65-80 ksi (410-550 MPa), or about 30-45% less than example alloys in class Ti-6Al-4V.

To protect and reinforce airfoil 32 proximate leading edge 38, sheath 34 is formed of a high-strength metallic material. In one example, this is a titanium alloy. In another example, sheath 34 is formed from a titanium alloy that includes aluminum and vanadium. In other examples, this is a Ti-6Al-4V alloy. As noted above, Ti-6Al-4V alloys have yield strengths ranging up to about 120 ksi (830 MPa) but are much heavier than the lightweight airfoil material. Alternatively, other high-strength metallic materials used in aircraft engines are also suitable for sheath 34. Such examples also include nickel or its alloys. In other examples, the nickel alloy also contains cobalt, aluminum, or both.

Sheath 34 covers airfoil 32 proximate leading edge 38, protecting airfoil 32 from foreign object damage described above. Sheath 34 gives blade 30 a significant amount of strength, even when airfoil 32 is made of a lightweight and more ductile material like an aluminum alloy. Substituting a lighter material in airfoil 32 improves both initial raw material costs and engine efficiency by reducing the overall weight of blade 30. The reduced weight also allows for additional volume of sheath 34 proximate airfoil forward edge 54, while still saving weight overall in blade 30. Additional material on sheath 34 improves repairability of blade 30, as will be described in more detail with reference to FIG. 3B.

The most protection of blade 30 is seen when sheath 34 extends across substantially the entire length of leading edge 38. In certain embodiments, a small portion of airfoil forward edge 54 proximate platform 46 forms the remainder of blade leading edge 38 in FIG. 2 as described below. In other embodiments, sheath 34 only extends over a part of the spanwise length of leading edge 38. As seen in FIG. 2A, sheath 34 also covers a portion of the surface area of suction surface 42 proximate leading edge 38. As can be seen in later figures, sheath 34 also covers a corresponding portion of the surface area of pressure surface 44.

The following example of the relative sizes of the components of blade 30 is included for illustrative purposes only and can readily be adapted by one skilled in the art for a variety of engine and blade designs. The dimensions of sheath 34 will vary depending on a number of factors as described below, including the size and shape of blade 30. The size and shape of blade 30 depend on the size and operating envelope of engine 10, which is itself often selected by the purchaser or end user of an aircraft utilizing engine 10.

In one example, engine 10 measures about 70 inches (178 cm) in overall diameter. In this example, blades 30 measure between about 24-32 inches (60-81 cm) spanwise from platform 46 to tip edge 48, and about 8-16 inches (20-40 cm) chordwise from leading edge 38 to trailing edge 40 at various points along the spanwise length of blade 30. In this example and in others, there is substantial variation in the chordwise dimension of blades 30, particularly because suction surface 42 is by definition longer than pressure surface 44, and both surfaces generally are longer chordwise closer to tip edge 48. Therefore, for simplicity and ease of illustration, an average chordwise dimension of about 12 inches (30 cm) will be used as a convenient reference to calculate examples of relative percentages of various components of blade 30. However, the percentages will vary along different locations of blade 30 in this and other embodiments.

In the example shown in FIG. 2, sheath 34 extends spanwise from tip edge 48 to a point proximate platform 46, defined by sheath inner end 56. Here, sheath 34 ends at inner end 56, just short of platform 46 to simplify production of sheath 34. Blade 30 is thicker proximate platform 46 than in other portions of blade 30 in order to engage with dovetail root 36. Covering this thicker portion with sheath 34 complicates production of blade 30. Further, dovetail root 36 reinforces blade 30 proximate platform 46 making reinforcement of platform 46 by sheath 34 redundant.

In one example, the approximate distance between sheath root end 34A of sheath 34 and root 36 is about 0.5 inches (1.3 cm). This distance can vary based on the size and curvature of blade 30. However, other configurations of root 36 or other considerations can indicate that sheath 34 is to be extended over the remainder of airfoil forward edge 54 to platform 46.

For example, platform 46 is shown in FIG. 2 as integral with airfoil 32. However, in other embodiments, platform 46 can alternatively be made separate from airfoil 32. In these embodiments, the curvature and dimension of airfoil 32 proximate root 36 can simplify extension of sheath 34 to root end 56 without interference of integral platform 46.

Sheath head section 50 of sheath 34 extends forward (i.e., into the oncoming air stream) away from airfoil 32 and forms leading edge 38. Sheath head section 50 provides stiffness and resiliency in the event of a direct or near-direct strike from a foreign object and minimizes damage to the underlying airfoil 32.

Due to the curvature of blade 30 proximate platform 46, sheath 34 also has two spanwise sections where its dimensions vary, defined by outer sheath region 34A and inner sheath region 34B. In distal sheath region 34A, the chordwise dimension of sheath head section 50 is substantially constant. In inner region 34B, the chordwise dimension of forward sheath head section 50 tapers between the dimension seen in distal region 34A and the dimension at sheath inner end 56. The difference in the chordwise dimension of head section 50 can be seen from the following example.

In this example, in distal region 34A, sheath head section 50 extends forwardly chordwise (i.e. into the oncoming air) about one inch (2.5 cm) from airfoil forward edge 54 to leading edge 38, or about 8% of the example average chordwise dimension noted above (about 12 inches/30 centimeters). Here, this chordwise dimension is substantially constant along the entire spanwise length of distal region 34A.

However, at inner end 56 of sheath 34, the chordwise dimension of sheath head section 50 is about 0.4 inches (10 cm), or about 3% of the average chordwise dimension of blade 30. Between root end 56 and the junction with outer region 34A, head section 50 has a chordwise dimension tapering between about ⅜ inch (0.10 cm) and about one inch (2.5 cm). Therefore, in this example, over the spanwise length of sheath 34, the chordwise dimension of sheath head section 50 is at least about 3% of the chordwise dimension of blade 30, as is the case in inner region 34B. In outer region 34A located distal platform 46, the chordwise dimension of head section 50 is at least about 8% of the chordwise dimension of blade 30. To ensure proper weight balancing, weight savings, and centrifugal strength of blade 30 proximate platform 46, the chordwise length of sheath head section 30 does not exceed about 20% of the average chordwise dimension of blade 30.

In an effort to avoid sharp corners on blade 30, particularly near leading edge 38, spanwise tapering distance is provided in inner region 34B. In some embodiments, the spanwise dimension of inner sheath region 34B is approximately 5%-25% of the total spanwise dimension of sheath 34. In other embodiments, the spanwise dimension is about 10%-20% of the total spanwise length of sheath 34. In yet other embodiments, the spanwise dimension is about 15% of the total spanwise length of sheath 34.

The prior example shows the chordwise dimension of forward sheath head section 50 to be substantially constant through outer region 34A and tapering through inner region 34B to inner end 56. Such an arrangement is not present in all embodiments. Other configurations of root 36 or a desire for increased foreign object protection at certain locations along leading edge 38 may require enlarging the chordwise and/or thickness dimensions of sheath head section 50 at various locations along leading edge 38.

Sheath 34 also includes flanks 52A and 52B extending substantially chordwise rearwardly from sheath head section 50 toward trailing edge 40. Flanks 52A and 52B extend over a portion of the area defined by one or both of suction surface 42 and pressure surface 44, respectively. Flanks 52A and 52B provide additional bonding or interface area for sheath 34 and protect blade 30 from indirect impacts proximate leading edge 38. The dimensions of flanks 52A and 52B, as well as other parts are more visible in the cross-section shown in FIGS. 3A-3B.

Figure 3A:
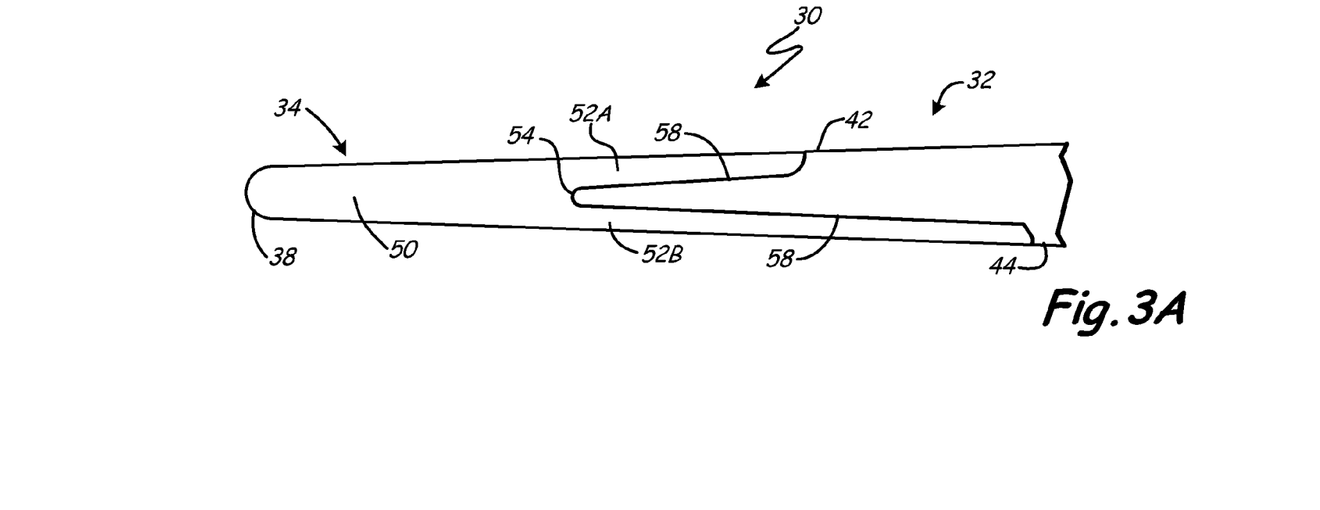
FIG. 3A is a cross-section of the airfoil shown in FIG. 2

FIG. 3A depicts a partial cross-section of blade 30 taken across line 3-3 of FIG. 2. Blade 30 includes airfoil 32, sheath 34, leading edge 38, suction surface 42, pressure surface 44, sheath head section 50, sheath flanks 52A and 52B, airfoil forward edge 54, and sheath receiving surface 58.

Sheath receiving surface 58 is located on airfoil 32 proximate leading edge 38 and includes a portion of suction surface 42 and pressure surface 44. Flanks 52A and 52B extend back from head section 50 over portions of suction surface 42 and pressure surface 44 proximate leading edge 38.

In some embodiments, sheath head section 50 replaces a portion of airfoil 32 near its forward edge, while in other embodiments, head section 50 increases the chordwise length of blade 30 by an amount equal to chordwise dimension of head section 50. This ensures aerodynamic continuity between airfoil portion 32 and sheath portion 34.

As described above in reference to FIG. 2, sheath head section 50 varies in its chordwise dimension along leading edge 38, including proximate platform 46. Flanks 52A and 52B can also vary in their chordwise lengths and respective thicknesses. In distal region 34A, flank 52A comprises about 1-2 inches (2.5-5.0 cm) of the chordwise dimension of suction surface 42, and flank 52B comprises about 1.2-2.4 inches (3.0-6.0 cm) of the chordwise dimension of pressure surface 44. Therefore, in this example, flank 52A constitutes about 8-16% of an average chordwise dimension of suction surface 42 and flank 52B constitutes about 10-20% of an average chordwise dimension of pressure surface 44 away from platform 46. In other embodiments, flanks 52A and 52B comprise up to about 30% of the average chordwise dimension of blade 30 along either suction surface 42 or pressure surface 44.

These dimensions help to achieve balance, centrifugal strength, and weight savings in blade 30. With the approximate 20% ceiling on the chordwise dimension of sheath head section 50 described above, in this example, sheath 34 does not comprise more than about 50% of the average chordwise dimension of blade 30 on either suction surface 42 or pressure surface 44.

Both flanks 52A and 52B measure about 0.02 inches (0.5 mm) in the blade thickness direction at the junction with head section 50, tapering to about 0.01 inches (0.3 mm) at points on sheath 34 farthest from leading edge 38. Like sheath head section 50, the chordwise lengths of flanks 52A and 52B are also substantially constant in this example in distal region 34A, while in inner sheath region 34B, those chordwise lengths taper toward airfoil forward edge 54. In certain embodiments, the chordwise lengths of flanks 52A and 52B taper from the lengths in outer span region 34A down to about 0.3-0.4 inches (7-10 mm) proximate sheath root end 56.

As seen in the previous example, flank 52B on pressure surface 44 can optionally be longer and/or thicker than flank 52A on suction surface 42. In the event of a bird strike proximate leading edge 38, a longer flank 52B on pressure surface 44 provides more surface and bonding area for sheath 34. The motion of blade 30 tends to force the bird to strike closer to pressure side 44, bending blade 30 opposite its regular curvature. Sheath head portion 50 is pushed toward suction surface 42 bending and shearing flank 52B away from pressure surface 44. Therefore, a larger bonding surface created by increasing the surface area of flank 52B will resist shearing of sheath 34 away from airfoil 32, increasing the likelihood that blade 30 can withstand a bird strike.

In other examples, design considerations may indicate that flank 52A on suction surface 42 should have the same or greater chordwise length than flank 52B on pressure surface 44. For example, one skilled in the art may decide to build blade 30 to provide more protection against small-scale damage and prevent crack initiation rather than to withstand bird strikes. The negative pressure caused by airflow over suction surface 42 is more likely to pull debris toward blade 30, increasing the risk of small-scale damage on suction surface 42. To do so, one can readily adjust the relative chordwise lengths of flanks 52A and 52B to compensate for the relative risks and desired level of protection.

Similar to the chordwise dimension or thickness of sheath head on 50, other design considerations may dictate that the chordwise dimension of flanks 52A and 52B will vary at different points along the spanwise direction of leading edge 32. While FIG. 2 shows that the lengths of flanks 52A and/or 52B are substantially constant in the chordwise direction along leading edge 38, these dimensions can vary according to a range of design variables depending on the nature of the intended use of blade 30. One example variable includes a higher risk of damage or weakness at different points along the spanwise dimension of leading edge 38.

Again, these dimensions can be readily adapted by one skilled in the art to a particular set of parameters in engine 10. For example, as the size of engine 10 increases, blades 30 will increase in size as well. Therefore, forward sheath section 50 can also be longer chordwise and or thicker to provide sufficient protection for larger blades 30. Alternatively, a larger blade 30 in some embodiments is stronger than a smaller blade 30 of similar shape, and thus the above described dimensions of sheath 34 will constitute a larger proportion of the dimensions of blade 30.

Another consideration in determining the dimensions of sheath 34 relative to blade 30 is the relative strength and weight of the metallic materials described above. For example, metallic materials with a substantially higher strength rating, when used to form airfoil portion 32, will generally require less of the stronger material at leading edge 38. For example, nickel and various alloys have yield strengths between about 1.5 times to about two times that of titanium alloys like Ti-6Al-4-V. In those embodiments, the dimensions of sheath 34 relative to airfoil 32 will be smaller for an otherwise equivalent blade 30.

These considerations will affect the size of forward sheath section 50 as well as flanks 52A and 52B. Flanks 52A and 52B will also vary in chordwise length and in thickness based on the amount of bonding area required with a given adhesive. As with most tasks of this nature, the goal will minimize the overall costs of airfoil 30, while providing efficiency and repair intervals acceptable to the operator of engine 10.

Figure 3B:
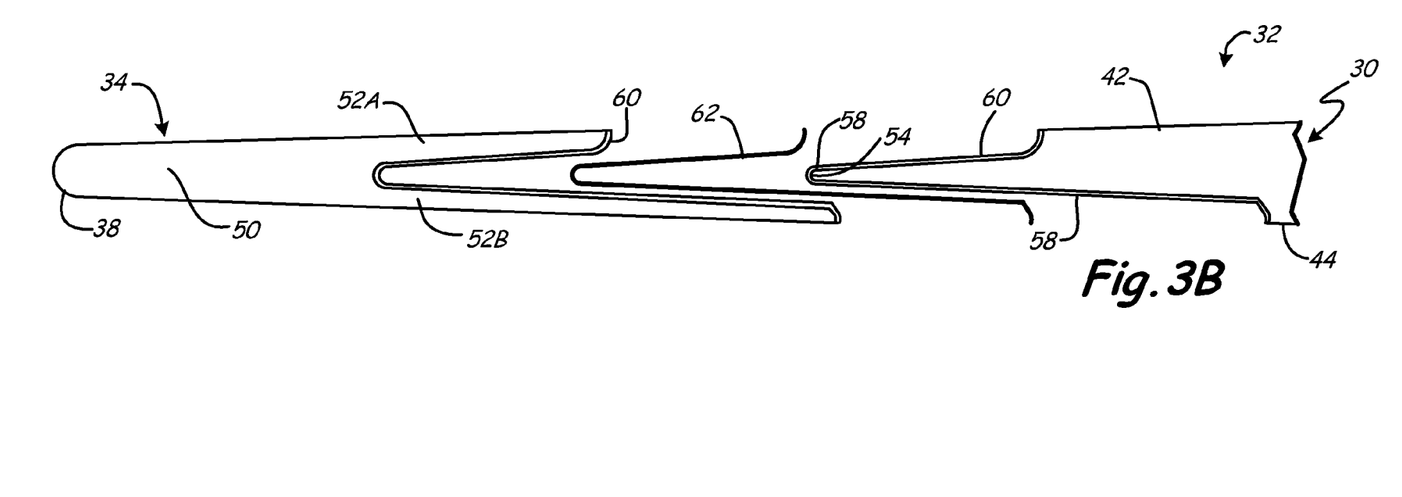
FIG. 3B is an exploded cross-section of the airfoil shown in FIG. 2.

FIG. 3B is an exploded cross-section of blade 30 shown in FIG. 3A. Blade 30 in FIG. 3B also includes airfoil 32, sheath 34, leading edge 38, suction surface 42, pressure surface 44, tip edge 48, sheath head section 50, sheath flanks 52A and 52B, forward airfoil edge 54, sheath receiving surface 58, adhesive 60, and scrim sheet 62.

When complete and placed into service, blade 30 has a smooth aerodynamic shape over all surfaces and edges. Therefore, airfoil 32 in some embodiments is shaped to accommodate placement of sheath 34 and minimize final processing time. This is accomplished, for example, by including sheath receiving surface 58 on airfoil 32. Surface 58 is a recessed portion of airfoil 32 located proximate leading edge 38, complementing the shape of sheath 34 and providing substantially uniform surfaces on completed blade 30. Surface 58 also will be recessed to a thickness sufficient to accommodate adhesive 60 and scrim sheet 62 described below. Recessed portion 58 can be formed during production of airfoil 32 or later during processing and before engagement of sheath 34 to airfoil 32.

Since sheath 34 can vary both in the thickness of head section 50, as well as the thickness and chordwise dimension of flanks 52A and 52B, surface 58 must be adapted accordingly. The edge of head section 50 that will eventually form leading edge 38 can be formed as near as possible to the final desired shape of leading edge 38 to minimize machining time and increase material yields by decreasing waste. The dimensions of the recessed portion defining receiving surface 58 can also be adjusted to account for the thickness and type of bonding material used between airfoil 32 and sheath 34, described below.

Due to the recessed portion of airfoil 32 defining surface 58, suction surface 42 and flank 52A are substantially flush with each other once combined. Similarly, pressure surface 44 and flank 52B are also substantially flush, leaving minimal gaps or changes in surface elevation chordwise along suction surface 42 and pressure surface 44. Any remaining gaps or undesired elevation changes can be mitigated by finish machining of blade 30 before placing it into service.

The application of corrosion and erosion resistant coatings to the sheath and airfoil surfaces also assists in smoothing any gaps or evening out undesired elevation changes. Addition of such coatings to airfoil 32 and sheath 34 also helps to reduce damage otherwise caused by continuous bombardment of blade 30 with sand, rain, and small runway debris pulled into engine 10. Erosion resistant coatings can prevent these and other small foreign objects from reaching the metal surfaces of airfoil 32 and sheath 34, hindering formation of small nicks and dings. Corrosion resistant coatings prevent the spread of corrosion outside of areas that have been damaged despite other protective measures.

Sheath 34 is held in place on surface 58 by adhesive 60. A variety of commercially available aerospace-quality metal-bonding adhesives are suitable, including several epoxy- and polyurethane-based adhesive films. In some embodiments, the adhesive is heat-cured via autoclave or other similar means. Examples of suitable bonding agents include type EA9628 epoxy adhesive available from Henkel Corporation, Hysol Division, Bay Point, Calif. and type AF163K epoxy adhesive available from 3M Adhesives, Coatings & Sealers Division, St. Paul, Minn.

In certain embodiments, such as is shown in FIG. 3B, the adhesive is a film, which also contributes a minute amount of thickness of blade 30 proximate sheath 34. In one example, a layer of adhesive film 60 is about 0.005-0.010 inch (1.2-2.5 mm) thick. Despite the additional thickness, a film-based adhesive 60 allows for generally uniform application, leading to a predictable thickness to be accounted for in sizing flanks 52A and 52B, as well as the thickness of airfoil 32 proximate forward airfoil edge 54.

Certain adhesives 60, including the example film-based adhesives above, are compatible with scrim sheet 62. Scrim sheet 62 provides dielectric separation between airfoil 32 and sheath 34, preventing galvanic corrosion between the two different metal surfaces of airfoil 32 and sheath 34. The material forming scrim sheet 62 is often determined by its compatibility with adhesive 60. One example scrim sheet is a flexible nylon-based layer with a thickness between about 0.005 inch (0.12 mm) and about 0.010 inch (0.25 mm) thick.

As described below, bonding of sheath 34 to airfoil 32 with adhesive 60 and separating the dissimilar metals with scrim sheet 62 improves several aspects of blade 30. When sheath 34 is produced separately and the contact surfaces of airfoil 32 and sheath 34 are properly prepared, complex high temperature bonding and forming processes are not necessary, and thus no deformation is caused around leading edge 38, allowing airfoil 32 to retain its shape and integrity during joining of sheath 34.

Conventional methods of manufacturing and bonding metals, such as welding, are generally insufficient to maintain uniformity in the underlying airfoil structure. While specialized laser and linear friction welding limit the excess heat and stresses caused by conventional welding, such processes do not provide a sufficient bonding surface or bonding area between the airfoil and the sheath. Further, in many circumstances, a welded sheath is prone to shearing away from the blade in the event of a foreign object strike because of the lack of sufficient bonding area on the pressure surface.

Diffusion bonding is inappropriate to directly form and place sheath 34 over leading edge 38 because the process can compromise the structural integrity of airfoil 32 and thus the entire blade 30. In an example of aluminum alloy airfoil 32, the high temperatures of diffusion bonding a titanium sheath have been known to cause undesired phase transitions and boundaries when done in close proximity to key portions of airfoil 32, such as proximate forward airfoil edge 54. Such transitions weaken the microstructure and damage airfoil 32 if proximate forward airfoil edge 54. However, sheath 34, so long as there is sufficient strength in sheath head portion 50 and sufficient bonding area for flanks 52A and 52B as described above, can be separately diffusion bonded or electroformed and attached using adhesive 60 and, if necessary, scrim sheet 62.

Electroformed sheaths have been used in certain propeller and helicopter blades to provide wear and erosion resistance. However, such technology cannot be easily adapted to blades 30 for use in a turbofan engine such as engine 10. Electroformed nickel sheaths presently in use on helicopter and propeller blades are provided for wear resistance only and are not built to withstand the rigors of a turbofan engine, including the greater number and speed of foreign objects striking the blades. For example, they do not have adequate strength or thickness along the leading edge and their flanks do not have sufficient bonding area to prevent shearing away of a sheath.

Helicopter and propeller blades also have a comparatively large radius at their leading edge, which decreases their aerodynamic efficiency relative to what is required for turbofan blades. For example, in certain embodiments, the radius at leading edge 38 is less than about 0.5 mils (125 μm). In other embodiments, the radius is less than about 0.4 mils (100 μm). On a turbofan blade, as with any airfoiled structure, aerodynamic efficiency is maximized as that radius approaches zero. However, electroforming a sheath with such a small radius at leading edge 38 and a large thickness proximate airfoil leading edge 54 requires sheath head portion 50 to be much longer and thicker in the chordwise direction. Creating sheath 34 with such relative sizes via electroforming is difficult and impractical, though not impossible.

Additionally, electroforming is possible with a relatively small number of materials otherwise suitable for aircraft applications. For example, substantially pure metals and certain alloys like Ni—Co are readily electroformed into an article while maintaining the desired material properties. However, many titanium alloys used in aircraft applications, such as Ti-6Al-4-V, have unique microstructures that contribute substantially to their strength and relatively light weight. The temperatures necessary to properly crystallize and anneal these microstructures are not possible during an electroforming process. While the materials are limited, sheaths 34 that are electroformed separately as described in the previous paragraph can also be adhesively bonded to airfoil 32 so long as the material is conducive to being electroformed into the desired shape.

The above-described dimensions of sheath 34 also result in improved repairability of blade 30. Having a larger volume of excess high-strength material on sheath 34 at leading edge 38 allows for more strength and resiliency, as well as extending the serviceable life of blade 30. Blades 30 are susceptible to nicks and erosion as well as bird strikes. As is known in the art, nicks and other small imperfections can serve as crack initiation sites, and can occur despite the inclusion of various erosion and corrosion resistant coatings.

However, blades 30 can be repaired, often several times, by machining out dents and other sharp corners. This repair is common in titanium-based blades to increase their serviceable life before being recycled into new blades or into other articles. In most titanium blades or sheaths, there is often a limited amount of excess material because of the inherent motivation to reduce weight and the physical constraints of producing sheaths with large thickness via processes like electroforming. But in blade 30, substituting a lower density metallic material in airfoil 32 provides substantial weight savings without sacrificing overall strength as previously described. This substantial weight savings provides some leeway for the size of sheath 34 to be increased in its chordwise and thickness dimensions while still achieving significant weight savings in blade 30.

Blade 30 as shown in FIGS. 2-3 can be made according to the following steps. Airfoil 32 is formed from a lightweight metallic material according to the description above, such as from an aluminum alloy. One example aluminum alloy is a 7XXX-series alloy. Example methods of making airfoil 32 include forging, casting, rolling or machining. Airfoil 32 is hollow or solid depending on relevant design requirements such as engine size and relative material and processing costs. Airfoil 32 has at least a forward edge, a first surface, and a second surface. Hollow airfoils 32 can be formed by any method, such as by diffusion bonding two metal plates around their perimeters.

Sheath 34 is formed from a high-strength metallic material according to the description above, such as from a titanium or nickel alloy. One example alloy is Ti-6Al-4-V. Sheath 34 is also fabricated using one or more conventional metal processing techniques, such as casting, forging, rolling, or machining, and can be manufactured directly into its final shape with first flank 52A and second flank 52B extending chordwise from sheath head section 50. Certain embodiments of sheath 34, such as those formed from nickel or nickel-cobalt alloys, can be electroformed or diffusion bonded separately from airfoil section 32.

Airfoil section 32 is adapted to accommodate sheath 34 by forming sheath receiving surface 58. In one example, airfoil 32 is adapted by removing sufficient material from proximate leading edge 38, including suction surface 42 and pressure surface 44 to create a recessed portion defined as sheath receiving surface 58. Alternatively, surface 58 can be formed during production of airfoil 32, for example if airfoil 32 is made by casting.

Once receiving surface 58 is formed on airfoil portion 32, sheath 34 is put into place, covering surface 58. Sheath 34 is then bonded to surface 58 using certain adhesives suitable for aerospace applications. For example, one can use a variety of high-strength epoxy-based adhesives otherwise suitable for metal-to-metal bonding in aircraft applications. Examples of suitable adhesives include Henkel EA9628 and 3M type AF163K epoxy adhesives, available as noted above.

Bonding is facilitated and strengthened by preparing surfaces with appropriate cleaning and texturing. The exact preparation is determined by the choice of adhesive. Curing of the adhesive, if necessary, is also determined by the type of adhesive chosen. Preparation of sheath 34 as well as attachment surface 58 of airfoil body 32 can be done by a combination of milling, chemical processing or other suitable means. After placement of the adhesive and scrim sheet, the adhesive is cured. As one example, the adhesive films listed above are heat cured, such as by autoclaving.

Finally, once the bonding step is complete, blade 30 is machined or otherwise formed into its final desired shape. If airfoil 32 and sheath 34 are formed nearly into their final shapes and bonding is successful, only final machining is required. Alternatively, in certain embodiments, the components are machined prior to bonding such that major surfaces of blade 30 have minimal elevation changes and gaps immediately after bonding, making finish machining unnecessary.

Final processing can also include covering blade 30 with erosion or corrosion resistant coatings. These coatings protect the surfaces of blade 30, including at any remaining gaps between airfoil 32 and sheath 34. The exact shape will depend on the particular flow characteristics desired for engine 10. This disclosure can be readily adapted to blades 30 having a wide variety of flow patterns. In addition, one or more of the preceding steps may be omitted, combined, reordered, or adapted to a particular set of circumstances without departing from the scope and spirit of the invention.

Once complete, hybrid metal blade 30 greatly improves the performance of a blade made of a lightweight metal, such as an aluminum alloy, while saving a significant amount of cost and weight over a titanium alloy blade. These improvements are seen while limiting safety, maintenance, and downtime costs as described herein.

Blade 30 was tested in a simulation of a medium-sized bird strike. Test panels with and without sheath 34 were used to compare the strength and performance of blade 30. Airfoil body 32 was modeled using a 7XXX-series aluminum alloy sheet, and sheath 34 was modeled with titanium alloy Ti-6Al-4-V. A projectile weighing about 2.5 pounds (1.1 kg), traveling at about 750 feet per second, struck the test panels at an angle of incidence of about 26°.

The test panel with simulated sheath 34 exhibited between about 3-6% leading edge line strain. In comparison, the unprotected aluminum test panel exhibited about 20-25% leading edge line strain after being struck by the test projectile.

It should be noted that while a solid blade 30 is shown and described in this disclosure, this specification and the appended claims are not so limited. The invention is readily adaptable to hollow blades 30, the use of which in conjunction with sheath 34 as described herein, will only add to the cost and weight savings achieved.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

What is claimed is:

1. A blade comprising:
   an airfoil portion formed from a monolithic first metallic material, the airfoil portion having a forward airfoil edge, a first airfoil surface, and a second airfoil surface, each airfoil surface extending from proximate a platform to proximate a blade tip edge;
   a sheath portion formed from a second metallic material, the sheath portion having a solid sheath head section, a first sheath flank and a second sheath flank, the solid sheath head section extending chordwise forwardly from the forward airfoil edge, and both flanks extending chordwise rearwardly from a junction of the sheath head section and the forward airfoil edge such that the sheath head section defines a thickness of the blade forward of the forward airfoil edge up to and including a blade leading edge continuously from proximate the platform and terminating proximate the blade tip edge; and
   a dielectrically protective nylon-based scrim sheet disposed between the sheath portion and the airfoil portion;
   wherein the first metallic material is an aluminum alloy;
   wherein the sheath portion is a single piece bonded to the airfoil portion such that the sheath head section covers the forward airfoil edge; the first sheath flank covers a portion of the first airfoil surface proximate the airfoil forward edge, jointly defining a blade suction surface; and the second sheath flank covers a portion of the second airfoil surface proximate the airfoil forward edge, jointly defining a blade pressure surface opposite the blade suction surface; and
   wherein a chordwise dimension of the sheath head section is at least 3% of a chordwise blade dimension in an inner span region, and at least 8% of a chordwise blade dimension in a distal span region.

2. The blade of claim 1, wherein a density of the first metallic material is between about 10% and about 60% less than a density of the second metallic material.

3. The blade of claim 2, wherein the density of the first metallic material is between about 25% and about 50% less than the density of the second metallic material.

4. The blade of claim 1, wherein a yield strength of the first metallic material is between about 10% and about 60% less than a yield strength of the second metallic material.

5. The blade of claim 4, wherein the yield strength of the first metallic material is between about 20% and about 50% less than the yield strength of the second metallic material.

6. The blade of claim 1, wherein the aluminum alloy is a 7XXX-series alloy.

7. The blade of claim 1, wherein the sheath portion is formed from a titanium alloy.

8. The blade of claim 7, wherein the titanium alloy also includes aluminum and vanadium.

9. The blade of claim 8, wherein the titanium alloy is a Ti-6Al-4V alloy.

10. The blade of claim 1, wherein the sheath portion is bonded to the airfoil portion with an epoxy-based adhesive.

11. The blade of claim 10, wherein the epoxy-based adhesive is a film.

12. The blade of claim 1, wherein the chordwise dimension of the sheath head section is between about 3% and 20% of the chordwise dimension in the inner span region.

13. The blade of claim 1, wherein the chordwise dimension of the sheath head section is between about 8% and about 20% of the chordwise dimension in the outer span region.

14. The blade of claim 1, wherein the sheath second flank has a longer chordwise dimension on the blade pressure surface than the chordwise dimension of the first flank on the blade suction surface.

15. The blade of claim 14, wherein a chordwise dimension of the sheath first flank and a chordwise dimension of the sheath second flank are each between about 8% and about 30% of an average chordwise dimension of the blade.

16. The blade of claim 1, wherein the sheath portion comprises no more than 50% of a chordwise dimension of any portion of the blade along either the suction surface or the pressure surface.

17. The blade of claim 1, wherein the sheath head section includes a substantially constant chordwise dimension along an outer sheath region, and a tapered chordwise dimension along an inner sheath region.

18. The blade of claim 17, wherein the first sheath flank and the second sheath flank each include a substantially constant chordwise dimension along an outer sheath region, and a tapered chordwise dimension along an inner sheath region.

19. The blade of claim 18, wherein a first thickness of the first sheath flank and a second thickness of the second sheath flank are each tapered along the chordwise dimension along both the outer sheath region and the inner sheath region.

20. A method of making a blade, the method comprising:
    forming an airfoil portion from a monolithic aluminum alloy, the airfoil portion having a forward airfoil edge, a first airfoil surface and a second airfoil surface, each airfoil surface extending from proximate a platform to proximate a blade tip edge;
    forming a sheath portion from a high-strength metallic material, the sheath section having a solid sheath head section, a first sheath flank, and a second sheath flank, both flanks extending chordwise rearwardly from the sheath head section;
    forming receiving surfaces on a portion of the first airfoil surface and a portion of the second airfoil surface proximate the airfoil forward edge to accommodate the sheath portion;
    placing a dielectrically protective nylon-based scrim sheet over at least one of the sheath portion, the forward airfoil edge, and the receiving surfaces of the airfoil portion;
    covering the forward airfoil edge and the receiving surfaces of the airfoil portion with the sheath portion such that the solid sheath head section extends chordwise forwardly from the forward airfoil edge, and such that the sheath head section defines a thickness of the blade forward of the forward airfoil edge up to and including a blade leading edge continuously from proximate the platform and terminating proximate the blade tip edge; and
    adhesively bonding the dielectrically protective scrim sheet between the sheath portion and the airfoil portion;
    wherein a chordwise dimension of the sheath head section is at least 3% of a chordwise blade dimension in an inner span region, and at least 8% of a chordwise blade dimension in a distal span region.

21. The method of claim 20, wherein the bonding step is performed with epoxy-based adhesive.

22. The method of claim 20, further comprising machining the blade to form a flush suction surface and a flush pressure surface between the sheath portion and the airfoil portion.

23. A sheath for a gas turbine blade comprising:
    a solid metallic head section defining a thickness of the blade forward of the forward airfoil edge up to and including a blade leading edge continuously including a suction surface and a pressure surface, the suction surface and the pressure surface each extending chordwise from a leading edge surface, and extending spanwise between a sheath root end and a sheath tip end, the sheath tip end corresponding to a portion of an airfoil tip end;
    a suction side flank including an outer surface contiguous with the suction surface of the head section, the suction side flank extending spanwise between the sheath root end and the sheath tip end;
    a pressure side flank including an outer surface contiguous with the pressure surface of the head section, the pressure side flank extending spanwise between the sheath root end and the sheath tip end; and
    a dielectrically protective nylon-based scrim sheet applied to an inner surface of one or more of the head section, the suction side flank, and the pressure side flank;
    wherein the solid metallic head section, the suction side flank, and the pressure side flank form a contiguous sheath surface adapted to receive a forward airfoil edge of an airfoil portion formed from a monolithic aluminum alloy; and
    wherein a chordwise dimension of the sheath head section is at least 3% of a chordwise blade dimension in an inner span region, and at least 8% of a chordwise blade dimension in a distal span region.

24. The sheath of claim 23, wherein the sheath portion is formed from an alloy selected from one of: a titanium alloy, and a nickel alloy.

25. The sheath of claim 24, wherein the first sheath flank and the second sheath flank each include a substantially constant chordwise dimension along an outer sheath region, and a tapered chordwise dimension along an inner sheath region.

26. The sheath of claim 23, wherein the sheath head section includes a substantially constant chordwise dimension along an outer sheath region, and a tapered chordwise dimension along an inner sheath region.

27. The sheath of claim 25, wherein a first thickness of the first sheath flank and a second thickness of the second sheath flank are each tapered along the chordwise dimension along both the outer sheath region and the inner sheath region.

28. The sheath of claim 23, wherein at least one of the suction side flank and the pressure side flank are diffusion bonded to the head section.

* * * * *